Dec. 1, 1964     M. V. HERBERT ETAL     3,158,996
CONTROL SYSTEMS FOR GAS TURBINE ENGINES
Filed Jan. 8, 1960     4 Sheets-Sheet 1

Michael V. Herbert
William G. E. Lewis
Dennis H. Mallinson
Inventors

By Cushman, Darby & Cushman
Attorneys

Dec. 1, 1964    M. V. HERBERT ETAL    3,158,996
CONTROL SYSTEMS FOR GAS TURBINE ENGINES
Filed Jan. 8, 1960    4 Sheets-Sheet 2

Dec. 1, 1964  M. V. HERBERT ETAL  3,158,996
CONTROL SYSTEMS FOR GAS TURBINE ENGINES
Filed Jan. 8, 1960  4 Sheets-Sheet 4

Michael V. Herbert
William J. E. Lewis
Dennis H. Mallinson
Inventors

By
Cushman, Darby & Cushman
Attorneys

United States Patent Office 3,158,996
Patented Dec. 1, 1964

3,158,996
CONTROL SYSTEMS FOR GAS TURBINE ENGINES
Michael Vaughan Herbert, Fleet, William Gerald Eric Lewis, Pyestock, Cove, and Dennis Hainsworth Mallinson, Fleet, England, assignors to Power Jets (Research and Development) Limited, London, England, a British company
Filed Jan. 8, 1960, Ser. No. 2,323
Claims priority, application Great Britain Jan. 8, 1959
2 Claims. (Cl. 60—35.6)

This invention relates to the control of gas turbine jet propulsion engines of the "non-reheat" type, that is engines without afterburners for the combustion of reheat fuel. The invention is more particularly concerned with engines intended for operation under conditions of supersonic flow at the air intake.

In all gas turbines designed for the jet propulsion of aircraft, it is a requirement that the engine shall be matched to the air intake, and this requirment is of particular significance in the case of engines designed for supersonic flight conditions over a fairly wide range of speed and altitude. Thus in general, the intake configuration must be varied to allow for the varying flight speed. Moreover the intake, when in any given configuration, will be matched to a particular mass flow, and it can accept with stability only a narrow range of flows differing from the flow for which the intake is designed.

It follows therefore that the usual method of control of a gas turbine jet propulsion engine, which involves varying the propulsive thrust by varying the fuel supply and hence the speed of and the mass flow through the engine, is not readily applicable to engines intended for supersonic operation under the conditions indicated above. The use of such a method would require a control system in which the intake configuration is related not only to the flight speed but also to various operating conditions of the engine, and the complication involved would be considerable.

It is an object of the present invention to provide a method of control of a gas turbine jet propulsion engine in which variations of the propulsive thrust have the minimum effect on the intake air mass flow. Thus it should be possible substantially to separate the control of the intake configuration from the control of the engine itself, so that the problems of engine/intake matching are simplified. A further object is the provision of a control system for effecting the method of control aforesaid.

The invention accordingly provides a method of controlling a gas turbine jet propulsion engine of the non-reheat type under supersonic flow conditions at the engine air intake and choked flow conditions at the jet nozzle wherein the propulsive thrust of the engine is varied by varying the area of the nozzle while the engine rotational speed is maintained substantially constant over at least part of the engine operating range.

The invention further provides a control system for a gas turbine jet propulsion engine of the non-reheat type comprising a control for varying the jet nozzle area so as to vary the propulsive thrust of the engine and governing means for automatically maintaining the engine rotational speed substantially constant over at least part of the engine operating range.

According to a feature of the invention, at relatively low values of compressor inlet temperature $T_1$, the engine rotational speed $N$ is controlled so that the parameter $N/\sqrt{T_1}$ is maintained substantially constant.

The engine speed may be controlled by varying the engine fuel supply.

Some embodiments of the invention will now be described by way of example with refeernce to the accompanying drawings, of which:

Figure 1:
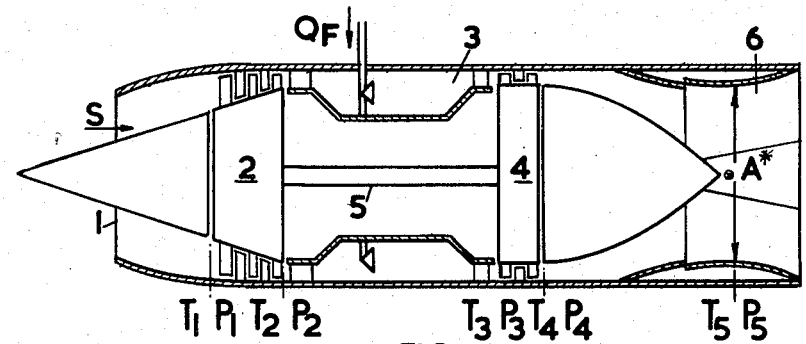
FIGURE 1 is a schematic view of an aircraft gas turbine jet propulsion engine, indicating the engine temperature and pressure values.

Referring firstly to FIGURE 1, there is shown diagrammatically a layout of a non-reheat gas turbine jet propulsion engine, the engine being one designed for operation under supersonic flight conditions. The engine includes an intake 1 for receiving an air flow at supersonic veolcity in a direction indicated by arrows, an axial flow compressor 2, a combustion system 3 and an axial flow turbine 4 arranged sequentially in the direction of flow. Fuel is supplied to the combustion system as indicated by $Q_F$, and the turbine 4 drives the compressor 2 through shaft 5 and provides an effluent stream of hot gas which is discharged through a convergent-divergent nozzle 6 as a propulsive jet. Under the operating conditions contemplated, the turbine nozzle and the jet propulsion nozzle 6 will be choked. The throat area $A^*$ of the nozzle 6 is arranged to be variable.

The letters T and P in FIGURE 1 indicate absolute total head temperature and pressure respectively whilst the numerical suffixes associated with these letters indicate the different stations along the engine as follows:

1—compressor inlet
2—compressor outlet
3—turbine nozzle inlet
4—turbine outlet
5—jet nozzle throat Symbols $\Delta T_{1,2}$; $\Delta T_{3,4}$ are employed herein to denote temperature rise in the compressor and temperature fall in the turbine respectively while $Q$ and $Q_F$ represent the engine air mass flow and the quantity of fuel supplied to the engine respectively.

Figure 2:
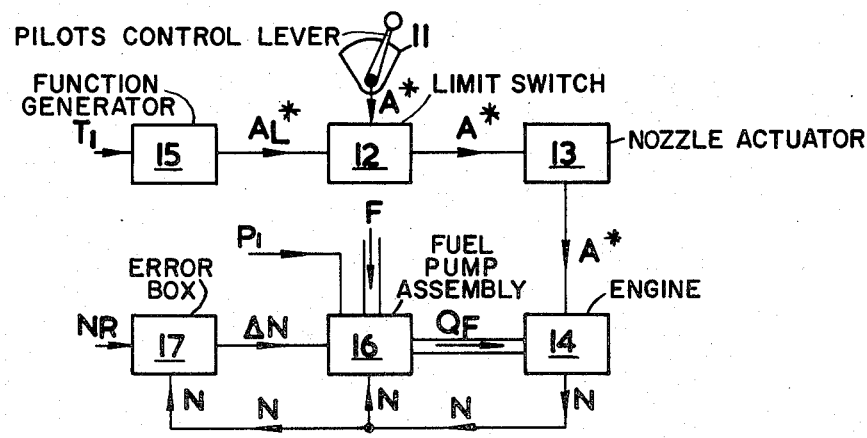
FIGURE 2 is a diagram showing a control system for the engine of FIGURE 1, flow lines carrying operating signals being shown in single lines and flow lines carrying fuel being shown in double lines.

In the control system shown in FIGURE 2, the pilot's control lever 11 for controlling the propulsive thrust is connected to apply a signal through a limit switch 12 to actuate a nozzle actuator 13 for varying the area $A^*$ of the throat of the jet nozzle of the engine 14. For increased thrust the nozzle throat area is reduced while for decreased thrust the nozzle is opened up. The limit switch 12 imposes a control on the pilot's lever such that for any given value of compressor inlet temperature $T_1$, there is a limiting minimum value of the area $A^*$ and for this purpose a signal $A^*_L$ proportional to this limiting area is fed into the limit switch 12 by a function generator 15 which itself is supplied with a signal proportional to the immediate value of $T_1$. This tends to prevent compressor surge or excessive values of turbine inlet temperature $T_3$ occurring except in the case of transients. The nature of the variation of $A^*_L$ with $T_1$ is discussed below.

Whilst changes in thrust are effected by variation of nozzle area A*, the rotational speed N of the engine 14 is governed to a substantially constant value by automatic variation of the engine fuel supply $Q_F$. Low pressure fuel (indicated at F) is supplied to a pump assembly 16 which pumps a quantity of fuel $Q_F$ to the engine 14. The pump may be driven by the engine 14 at engine speed N or at a speed proportional to engine speed N. A signal proportional to immediate engine speed N is applied continuously to an error box 17 to which is also applied a constant reference signal $N_R$ proportional to the rotational speed at which it is required to govern the engine. In the error box 17 the two signals N and $N_R$ are compared and any error, $\Delta N$, is applied to vary correctively the delivery of the pump to reduce the error and bring the compared signals into equality. The correction is such that for a positive $\Delta N$ signal (i.e., N greater than $N_R$) the rate of fuel supply is reduced, and vice versa.

A signal proportional to compressor inlet pressure $P_1$ may also be applied to the pump assembly 16 to vary the quantity of fuel delivered by the pump in response to changes in altitude.

The transient conditions which are likely to occur when propulsive thrust is varied differ from the above operating condition and will now be described with reference to the engine characteristic diagram of FIGURE 3. In this figure, compressor pressure ratio, $P_2/P_1$, is plotted against non-dimensional mass flow, $Q\sqrt{T_1}/P_1$. The line 21 is the compressor surge line.

If the engine is operating at the point $a$ on the line 22 which corresponds to a particular value of A* and on a particular $N/\sqrt{T_1}$ line 24, and the pilot's control lever is moved in a sense to increase the nozzle throat area A*, so as to reduce propulsive thrust at a particular altitude and flight speed, the temperatures $T_2$, $T_3$ remain momentarily constant whilst the air flow Q also remains constant due to the governed engine speed N and the configuration of the intake. As the true non-dimensional mass flow for the propelling nozzle under choked conditions, $Q\sqrt{T_5}/A^*P_5$, is constant and air flow Q is constant, $\sqrt{T_5}/P_5$ is proportional to A*. Since $T_5$ cannot increase significantly as A* is increased, $P_5$ must fall, and $P_4$ falls correspondingly. $P_3$ is, however, kept constantly momentarily because, as the turbine nozzles are choked and of constant area, $\sqrt{T_3}$ is proportional to $P_3$. Thus, the turbine pressure ratio $P_3/P_4$ increases and there is an immediate excess of turbine torque tending to increase r.p.m. at the point $a$. If, as described above, the engine fuel pump is run at engine speed or at a speed proportional thereto, there is a slight increase in fuel flow $Q_F$ as a new equilibrium running point $b$ is reached at a slightly higher compressor pressure ratio $P_2/P_1$. At the point $b$, however, an error signal, positive $\Delta N$, is applied to the fuel pump 16 and the fuel flow $Q_F$ consequently reduced. The nozzle area is unchanged and momentarily $T_3$, $T_4$, $T_5$ will fall along the line $b-c$ with no change of engine speed, point $c$ being a position on the same $$\frac{N+\Delta N}{\sqrt{T_1}}$$

line 23 corresponding to reduced pressure ratio.

Since the intake still keeps the mass flow of air Q constant (assuming no significant change in flight speed), $P_3$ is proportional to $\sqrt{T_3}$, whence $P_2$, which is considered to be proportional to $P_3$, and compressor pressure ratio fall to point $c$.

Now $\Delta T_{3,4}/T_3$ is constant with A*, (under choked conditions) and $\Delta T_{1,2}$ is constant with N, so that $\Delta T_{3,4}$ falls with respect to $\Delta T_{1,2}$ from point $b$ to point $c$. This power unbalance between $\Delta T_{3,4}$ on the one hand and $\Delta T_{1,2}$ as on the other, tends to produce a fall in engine speed. Hence the operating condition moves from point $c$ to point $d$ on the original $N/\sqrt{T_1}$ line 24 whilst fuel flow remains constant (except for any small reduction in supply due to reduction of pump speed). The point $d$ becomes the new equilibrium point at the new value of A*. Depending upon the response rates of the various system components, the ideal path $a \rightarrow b \rightarrow c \rightarrow d$ can become smoothed into a wave form, and several cycles may be required to achieve equilibrium of running at the new value of A*.

To effect an increase of thrust the operating path follows the inverse of that described with reference to FIGURE 3. The initial swing to a lower $N/\sqrt{T_1}$ line will tend to make the intake subcritical and if this cannot be accepted, an adequate margin of stability must be provided for by designing the intake for normal operation at a supercritical condition, so that the intake will not fall below the critical condition, during an increase in thrust.

Figure 4:
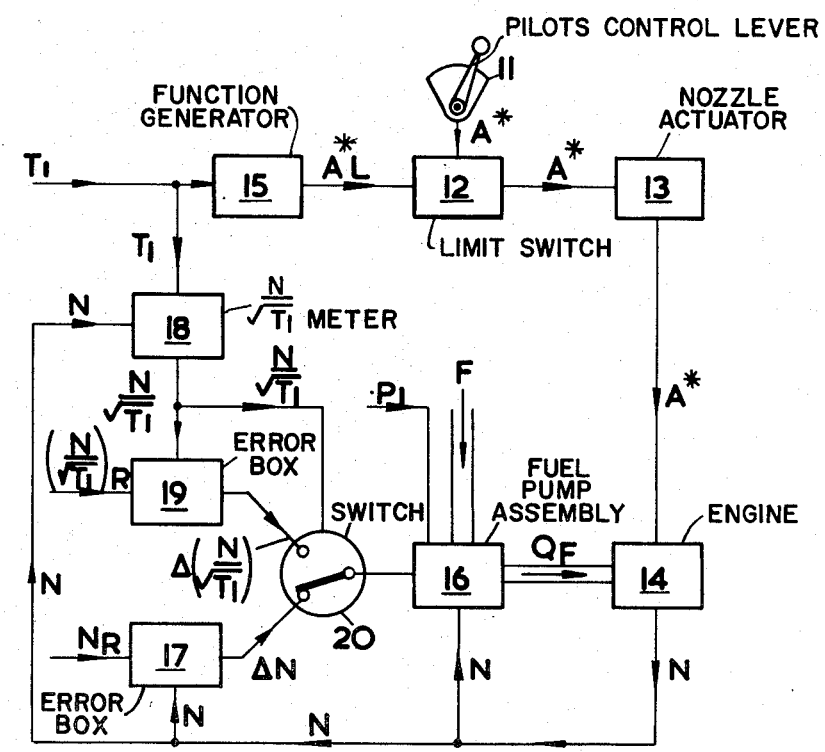
FIGURE 4 is a diagram showing a modified form of the control system of FIGURE 2.

In some applications of the invention, while it may be sufficient to control the engine at constant rotational speed N over most of its operating range, it may be necessary when in flight at low speeds and at high altitudes, i.e. at relatively low values of $T_1$, to maintain the parameter $N/\sqrt{T_1}$ substantially constant and to allow N to vary. Such a variation would be necessary to avoid surge or overheating. An arrangement for control in this manner is shown in FIGURE 4 in which components corresponding to those of FIGURE 2 are designated by the same reference numerals. A signal proportional to engine speed N is applied to a $N/\sqrt{T_1}$ meter 18 to which a signal proportional to $T_1$ is also fed, and the resultant signal, which is proportional to the immediate value of $N/\sqrt{T_1}$, is fed to an error box 19. A signal $$\left(\frac{N}{\sqrt{T_1}}\right)_R$$

proportional to required constant value of $N/\sqrt{T_1}$ is also supplied to the error box, and the two signals compared therein, the error signal $$\Delta\left(\frac{N}{\sqrt{T_1}}\right)$$

being applied to one pole of a switch 20. The other pole of the switch receives the error signal $\Delta N$ from the error box 17 as in the embodiment of FIGURE 2. By means of the switch, either the $\Delta N$ or the $$\Delta\left(\frac{N}{\sqrt{T_1}}\right)$$

signal can be applied to the pump to vary the engine fuel supply $Q_F$.

As shown in FIGURE 4, a $N/\sqrt{T_1}$ signal is also applied to operate the switch 20.

Figure 3:
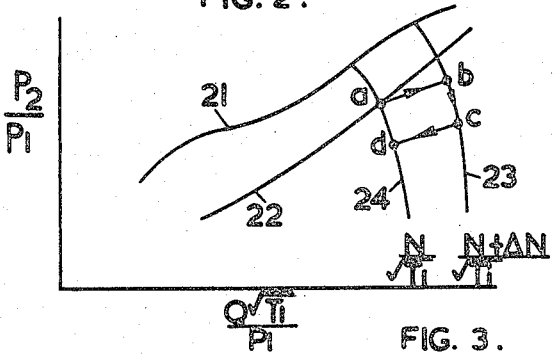
FIGURE 3 is an engine characteristic diagram showing the transient conditions obtaining during a thrust variation.
Figure 5:
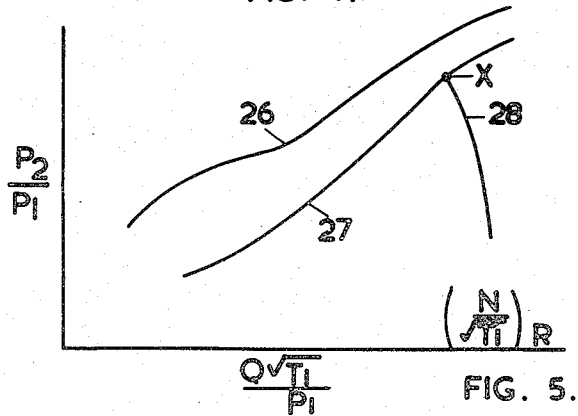
FIGURE 5 is an engine characteristic diagram showing the operating conditions of the control sytsem of FIGURE 4.

The mode of operation of the system of FIGURE 4 may be understood by reference to FIGURE 5 which is an engine characteristic diagram analogous to that of FIGURE 3. The compressor surge line is indicated at 26 and the engine operating limit line at 27. At the minimum permitted values of A* the engine is operated along the line 27 up to a point X which corresponds to a limiting maximum $N/\sqrt{T_1}$ value $$\left(\frac{N}{\sqrt{T_1}}\right)_R$$

represented by line 28, the switch 20 in FIGURE 4 being set in its normal position to apply the $\Delta N$ signal to the pump so that engine speed N is maintained constant. When the limiting value of $N/\sqrt{T_1}$ is reached, the $N/\sqrt{T_1}$ is reached, the $N/\sqrt{T_1}$ signal applied to the switch 20 operates the latter so that the $$\Delta\left(\frac{N}{\sqrt{T_1}}\right)$$

signal is applied to the pump and the engine is thereafter operated at a constant value of $N/\sqrt{T_1}$. When $N/\sqrt{T_1}$ falls below the limiting value, the switch 20 is reversed and the engine is again operated at constant speed N.

Figure 6:
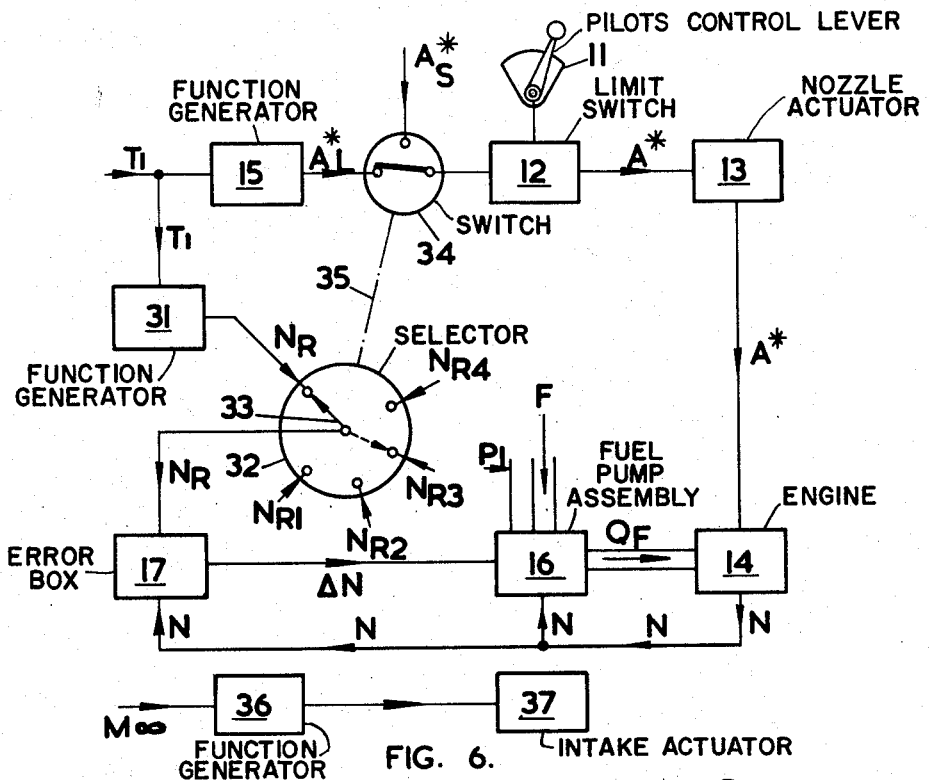
FIGURE 6 is a diagram showing a modified form of the control system of FIGURE 4.

In an alternative and preferred arrangement of the control system, control at constant N and constant $N/\sqrt{T_1}$ is integrated as shown in FIGURE 6, components corresponding to those of FIGURE 2 again being designated by the same reference numerals. In this embodiment the reference signal $N_R$ fed to the error box 17 is itself variable with compressor inlet temperature $T_1$ over the lower part of the range of the latter. A signal proportional to $T_1$ is fed into a function generator 31 and the resultant $N_R$ signal is fed through a selector 32 to the error box 17. For operation up to the limiting value $$\left(\frac{N}{\sqrt{T_1}}\right)_R$$

in FIGURE 5, the signal $N_R$ is constant so that the engine is governed at constant speed. At values of $N/\sqrt{T_1}$ beyond this limit, that is, at low values of $T_1$, the output signal $N_R$ from function generator 31 is altered so that it varies with $T_1$ in such a way that engine speed N is controlled to maintain $N/\sqrt{T_1}$ constant at the required limiting value.

The selector 32 enables the pilot to feed any one of a number of different reference signals $N_{R1}$, $N_{R2}$, $N_{R3}$, $N_{R4}$ into the error box 17 independently of the value of $T_1$. Thus a low engine speed may be selected for ground running and taxying by rotating the selector arm 33 to a position such as that indicated in dotted lines. The pilots' control lever 11 is then again used as a thrust trimming device.

Under conditions of engine run up or run down it may be necessary to impose a value of minimum $A^*$ different from that given by the output signal $A^*_L$ of function generator 15. This requirement may be met by applying to the limit switch 12 a signal $A^*_S$ proportional to the required minimum value of $A^*$, the changeover being effected by switch 34. The selector 32 and the switch 34 are interlocked as indicated at 35 to avoid the possibility of the selection of a reference signal such as $N_{R1}$ without the selection of an appropriate $A^*_S$ signal.

Provision for selecting a reference speed such as $N_R$, etc. independent of $T_1$ may likewise be incorporated in the embodiments of FIGURES 2 and 4.

FIGURE 6 also shows a further function generator 36 to which is fed a signal proportional to flight Mach. No. M∞, and which generates a signal which is supplied to the mechanism controlling the configuration of the intake 37 so that its configuration, e.g. its intake area/throat area ratio or the opening of spill ports, is matched to M∞. The intake control is quite separate from the engine control, since the matching of the intake is required to cater for only a limited departure from the critical flow conditions arising from transients as described with reference to FIGURE 3 above. In the embodiments of FIGURES 2 and 4, the intake configuration will similarly be controlled independently of the engine.

In the control systems described, it should be unnecessary to include any temperature limiting device, i.e. a device to restrict the value of turbine temperature $T_3$ or $T_4$.

Figure 7:
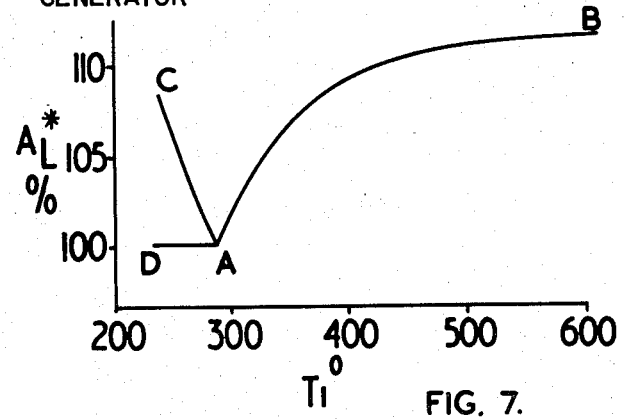
FIGURES 7 and 8 are graphs illustrative of the variation of jet nozzle area and engine speed obtaining in a typical embodiment of the invention.

The limit imposed by function generator 15 upon the minimum value of $A^*$ will depend upon the particular engine and its intended application. As illustrative example of the required variation is shown in the graph of FIGURE 7 in which the limiting value of nozzle area $A^*_L$ (shown as a percentage) is plotted against absolute compressor inlet temperature $T_1$. The curve AB represents the limit applicable in the temperature range from take-off value (here taken as 288° K. or 15° C.) upwards, and it will be seen that the limit increases with temperature but at a decreasing rate. If, as in the embodiment of FIGURE 2, $N/\sqrt{T_1}$ is allowed to increase beyond that obtaining at take-off, i.e. there is no $N/\sqrt{T_1}$ limit, the limiting value of $A^*$ at low temperatures is represented by curve AC, this being necessary to avoid surge. On the other hand, if $N/\sqrt{T_1}$ is limited to the take-off value as in the embodiments of FIGURES 4 and 6, the limiting value of $A^*$ will be represented by curve AD, i.e. it will be constant at temperatures below the take-off value. The output signal generated by function generator will be proportional to values of $A^*_L$ represented by curves CAB or DAB as the case may be.

Figure 8:
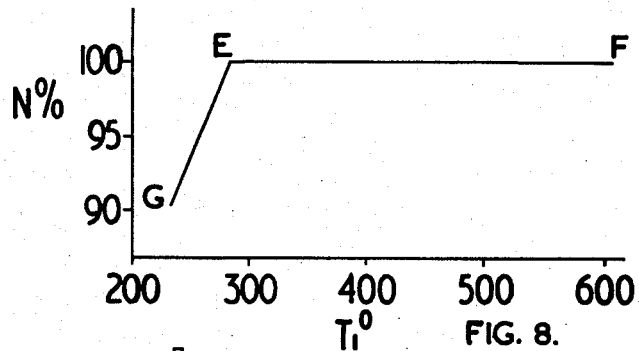

FIGURE 8 indicates the corresponding variation of engine rotational speed N (shown as a percentage), arising from the variation of the output signal $N_R$ of the function generator 31 in FIGURE 6. For values of $T_1$ above the take-off value (288° K.), the signal is constant and so engine speed N is maintained at a constant value as indicated by curve EF. For lower values of $T_1$, the engine speed N must be varied in accordance with the curve EG, so that $N/\sqrt{T_1}$ is maintained constant. The function generator 31 is thus designed to give an output signal proportional to the values of N represented by curve GEF.

The signals in the lines indicated in the diagrams of FIGURES 2, 4 and 6 may be electrical, pneumatic or hydraulic, the former in many cases being the most convenient.

Thus in one possible arrangement the nozzle actuator 13 of the engine is operated by an electric motor which can be set in motion by movement of the pilot's control lever 11. The signal $T_1$ is generated by a thermocouple or like device at the compressor intake and is amplified before being fed to function generator 15 and the latter generates an electrical output signal which in turn controls the setting of a stop in the limit switch, limiting the effective movement of the control lever.

The variable throat area jet nozzle may be of any known construction, one suitable arrangement being described in United States Patent No. 2,930,186 to Ashwood and Crosse, issued March 29, 1960.

The engine 14 drives a generator whereby an E.M.F. proportional to speed is applied to the error box 17 to constitute the N signal, while the reference signal $N_R$ is supplied by a source of constant E.M.F. The difference of these E.M.F.'s gives the $\Delta N$ signal.

Figure 9:
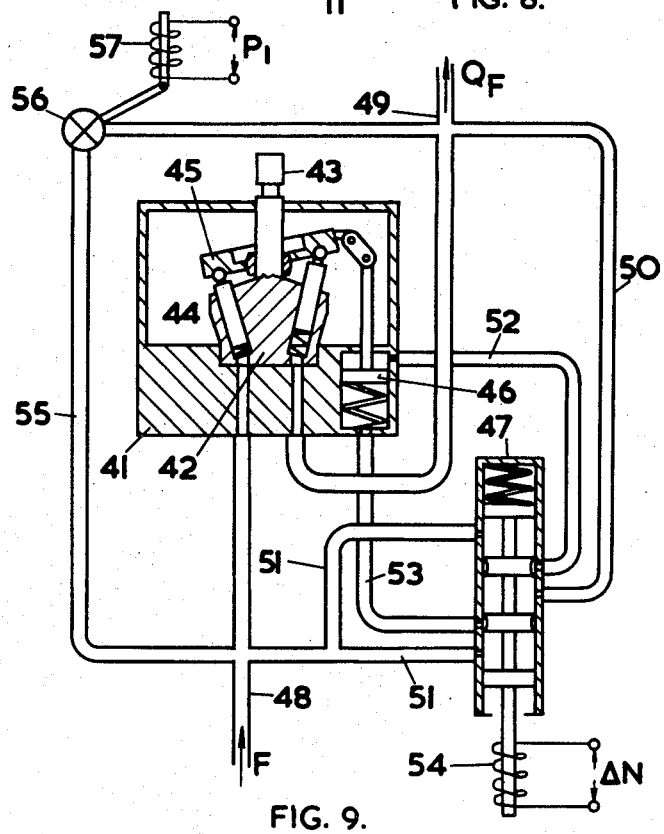
FIGURE 9 shows diagrammatically one possible engine fuel supply system.

One possible arrangement of the pump and its associated controls is shown in FIGURE 9. The pump 41 is of the known variable stroke type having a rotor 42 mounted on shaft 43 and a number of plungers 44 mounted in the rotor, the stroke of the plungers being varied by altering the setting of a swash plate 45. The swash plate setting is determined by the position of a servo piston 46, controlled by servo valve 47. Fuel is supplied to the pump through conduit 48 and is discharged therefrom through conduit 49. High pressure fuel is led from conduit 49 through conduit 50 to the servo-valve for use as servo-fluid, while drain conduits 51 lead from the servo-valve back to the fuel supply conduit 48. The servo-valve is connected to supply fluid to each side of the servo piston through conduits 52, 53.

The shaft 43 of the pump is either directly driven by the engine or is driven by a motor supplied by the generator supplying the N signal to error box 17. The position of the servo-valve is determined by a solenoid 54 to which is supplied the $\Delta N$ signal. Thus when $\Delta N$ is zero, the valve is in the null position shown, the servo piston and the swash plate are held at a particular setting and a particular rate of fuel supply $Q_F$ is maintained. A positive or negative $\Delta N$ signal moves the servo-valve in an appropriate sense to permit flow of servo-fluid in conduits 52 and 53 so that the servo piston 46 can move to adjust the obliquity of the swash plate and so vary the fuel supply $Q_F$ in a corrective sense to restore the engine speed to the required value, the servo-valve then returning to its null position.

The fuel discharge conduit 49 is also connected to the supply conduit 48 through a spill conduit 55 and spill valve 56. This valve is controlled by a solenoid 57 to which is applied an electrical signal proportional to $P_1$, this signal being derived from a pressure-sensitive element at the compressor inlet.

It will be understood that the N signal could be applied to control the spill valve 55 and the $P_1$ signal to control the servo valve 46, or both could be applied to control the servo valve. In the case of a pump of fixed output both the $\Delta N$ and $P_1$ signals could be used to control a spill valve.

The arrangements described above are applicable to all three embodiments illustrated. In the embodiment of FIGURE 4, the $N/\sqrt{T_1}$ meter 18 may be as described in United States Patent No. 2,800,015 in the name of Shaw, issued July 23, 1957, the temperature-sensitive resistance being located at the compressor inlet to give the $T_1$ signal and the N signal being derived from the engine-driven generator. The electrical output E.M.F. of the motor is compared with a constant E.M.F. proportional to $$\left(\frac{N}{\sqrt{T_1}}\right)_R$$

and the difference supplied to the switch 20. This is operated in a sense to change from the $\Delta N$ to the $$\Delta\left(\frac{N}{\sqrt{T_1}}\right)$$

signal by a relay actuated by a value of the $N/\sqrt{T_1}$ signal exceeding $$\left(\frac{N}{\sqrt{T_1}}\right)_R$$

by an amount greater than that which may occur in a normal transient as described with reference to FIGURE 3. A time delay is provided in the relay circuit to prevent hunting of the switch 20.

The switch might alternatively be operated in response to a positive $$\Delta\left(\frac{N}{\sqrt{T_1}}\right)$$

signal, greater than the transient value.

In the embodiment of FIGURE 6 the $T_1$ signal supplied to function generator 31 is the amplified output of a thermocouple device at the compressor inlet, and the function generator generates an electrical signal which varies with $T_1$, for example, as described above with reference to FIGURE 8.

The $N_{R1}$, $N_{R2}$, $N_{R3}$ and $N_{R4}$ signals and the $A^*_s$ signals are supplied from sources of constant E.M.F.

The control systems and methods of operation herein described are considered to be of particular application to a single spool engine such as that shown in FIGURE 1, but they are not necessarily applicable to a two spool, e.g. a double compound or a by-pass, gas turbine engine.

We claim:

1. A gas turbine jet propulsion engine of the non-reheat single spool type comprising an air intake designed to receive an air flow at supersonic velocities, a compressor, a combustion system, a turbine and a jet nozzle designed for operation under supersonic flight conditions arranged sequentially in the direction of flow; means for varying the jet nozzle area; a fuel supply to said combustion system; an open loop control system comprising a nozzle control connected to vary the area of said jet nozzle so as to vary the propulsive thrust; a closed loop control system separate from said open loop control system and comprising a fuel control for varying said fuel supply and governing means independent of said nozzle control and operable in response to engine rotational speed to automatically adjust said fuel control so as to vary the fuel supply in a sense to maintain engine rotational speed substantially constant over at least part of the engine operating range; and means operable in response to compressor inlet temperature $T_1$ to impose a minimum limit on the jet nozzle area, said limit increasing with $T_1$ over said part of the engine operating range.

2. A gas turbine jet propulsion engine of the non-reheat single spool type comprising an air intake designed to receive an air flow at supersonic velocities, a compressor, a combustion system, a turbine and a jet nozzle designed for operation under supersonic flight conditions arranged sequentially in the direction of flow; means for varying the jet nozzle area; a fuel supply to said combustion system; an open loop control system comprising a nozzle control connected to vary the area of said jet nozzle so as to vary the propulsive thrust; a closed loop control system separate from said open loop control system and comprising a fuel control for varying said fuel supply and governing means independent of said nozzle control and operable in response to engine rotational speed N and compressor inlet temperature $T_1$ to automatically adjust said fuel control so as to vary the fuel supply in a sense to maintain the parameter $N/\sqrt{T_1}$ substantially constant at relatively low values of $T_1$ and to maintain engine rotational speed N substantially constant at higher values of $T_1$; and means operable in response to compressor inlet temperature $T_1$ to impose a minimum limit on the jet nozzle area, said limit being constant at said low values of $T_1$ and increasing with $T_1$ at said higher values of $T_1$.

References Cited in the file of this patent

UNITED STATES PATENTS

| | | |
|---|---|---|
| 2,706,383 | Jacobson | Apr. 19, 1955 |
| 2,776,536 | Chudyk | Jan. 8, 1957 |
| 2,815,644 | Jacobson | Dec. 10, 1957 |
| 2,857,739 | Wright | Oct. 28, 1958 |
| 2,911,033 | Eley | Nov. 3, 1959 |
| 2,921,433 | Torell | Jan. 19, 1960 |
| 2,939,522 | Morley | June 7, 1960 |
| 2,984,969 | Torell | May 23, 1961 |

OTHER REFERENCES

NACA Research Memorandum No. E8B27, "Analysis of Parameters for Thrust Control of a Turbojet Engine Equipped With Air-Inlet Throttle and Variable-Area Exhaust Nozzle," by Boksenbom et al., Aug. 10, 1958.

Zucrow: "Aircraft and Missile Propulsion," vol. 1, pages 410 and 345, copyright by John Wiley and Sons, Inc., 1958.

Simonis: "Taming the Supersonic Turbojet," Aviation Age; vol. 29, No. 4; April 1958, pages 60–69, published by Conover-Mast Publications, Inc.